United States Patent [19]

Nagaoka et al.

[11] 4,170,026
[45] Oct. 2, 1979

[54] CIRCUITRY FOR LINE RECOGNITION OF A TELEVISION SIGNAL

[76] Inventors: Yoshitomi Nagaoka, 11-9, Naritaminami-machi, Neyagawa-shi, Osaka-fu; Tetsuo Tomimoto, 5-37, Tanabehigashi-cho, Higashisumiyoshi-ku, Osaka-shi, Osaka-fu; Reiichi Sasaki, 9-404, Korigaoka-jutaku, 1, Korigaoka, Hirakata-shi, Osaka-fu, all of Japan

[21] Appl. No.: 906,563

[22] Filed: May 16, 1978

[30] Foreign Application Priority Data

May 16, 1977 [JP] Japan ................................. 52/56950
May 17, 1977 [JP] Japan ................................. 52/57303

[51] Int. Cl.² ...................... H04N 7/02; H04N 5/48; H04N 9/62; H04N 9/535
[52] U.S. Cl. .................... 358/188; 358/139; 358/147; 358/10; 358/21 R
[58] Field of Search ................. 358/10, 27, 28, 139, 358/147, 148, 160, 21, 188

[56] References Cited

U.S. PATENT DOCUMENTS 3,867,010  2/1975  Rzeszewski ....................... 358/10
3,989,891  11/1976  Freestone ............................ 358/21

OTHER PUBLICATIONS

"GE's 'Broadcast-Controlled' Color System", Parts 1 and 2, *Electronic Technician/Dealer*, Aug. 1976, pp. 14-21, Sep. 1976, pp. 20-29.

*Primary Examiner*—John C. Martin
*Attorney, Agent, or Firm*—Wenderoth, Lind & Ponack

[57] ABSTRACT

Circuitry for line recognition of a television signal comprises a serration detector which receives the sync pulse and separates the portion of the serration of the vertical sync pulse; a first counter which is coupled to the serration detector and produces output pulse at specific time interval between two successive output pulses of the serration detector; a circuit which is triggered by the output pulse of the first counter and produces a pulse; a second counter which receives said pulse and the horizontal retrace pulse, counts said horizontal retrace pulse when said pulse has a specific level, becomes quiescent when said pulse has another specific level, and then produces the line identification pulse on the desired horizontal line; a first decoder which is connected to said second counter and produces the reset pulse for resetting said first counter after said first counter completes its desired counting action; and a second decoder which produces the reset pulse for resetting said circuit after said second counter produces desired line identification pulse.

8 Claims, 14 Drawing Figures

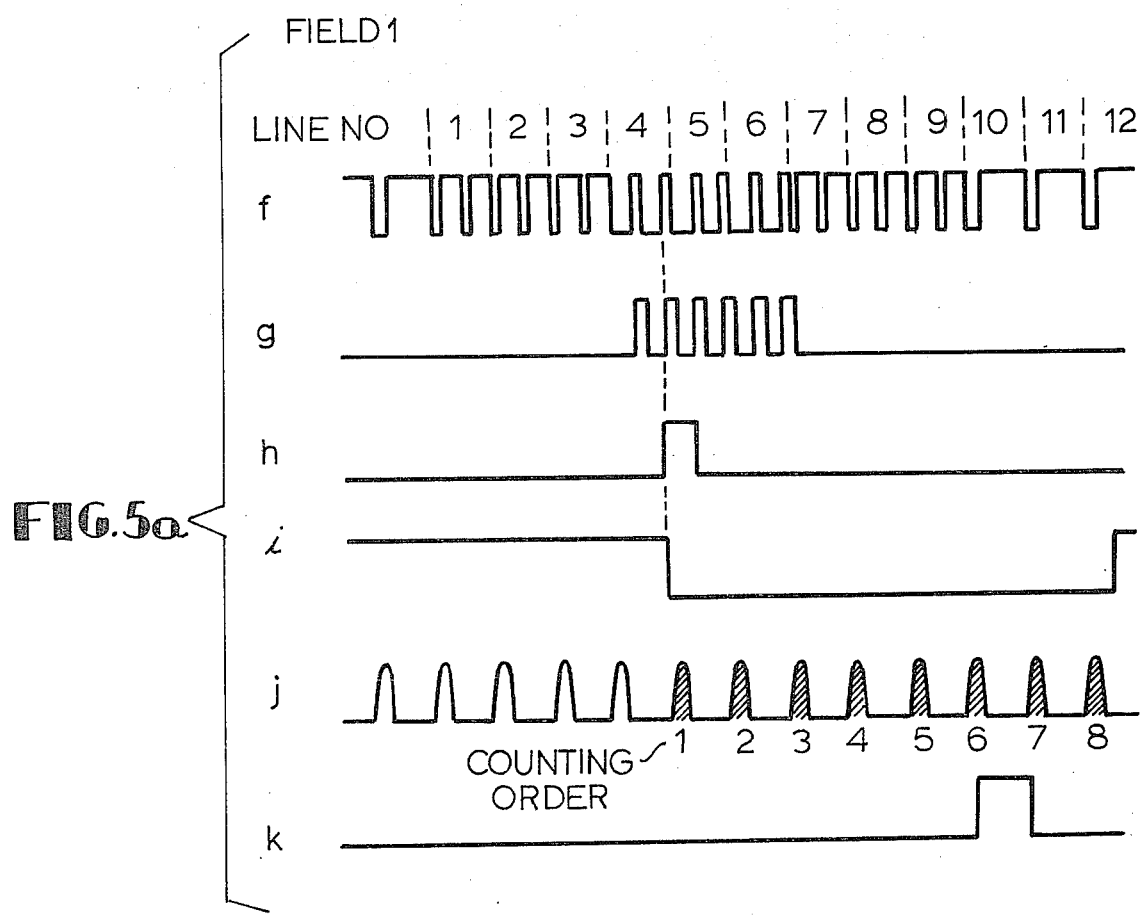

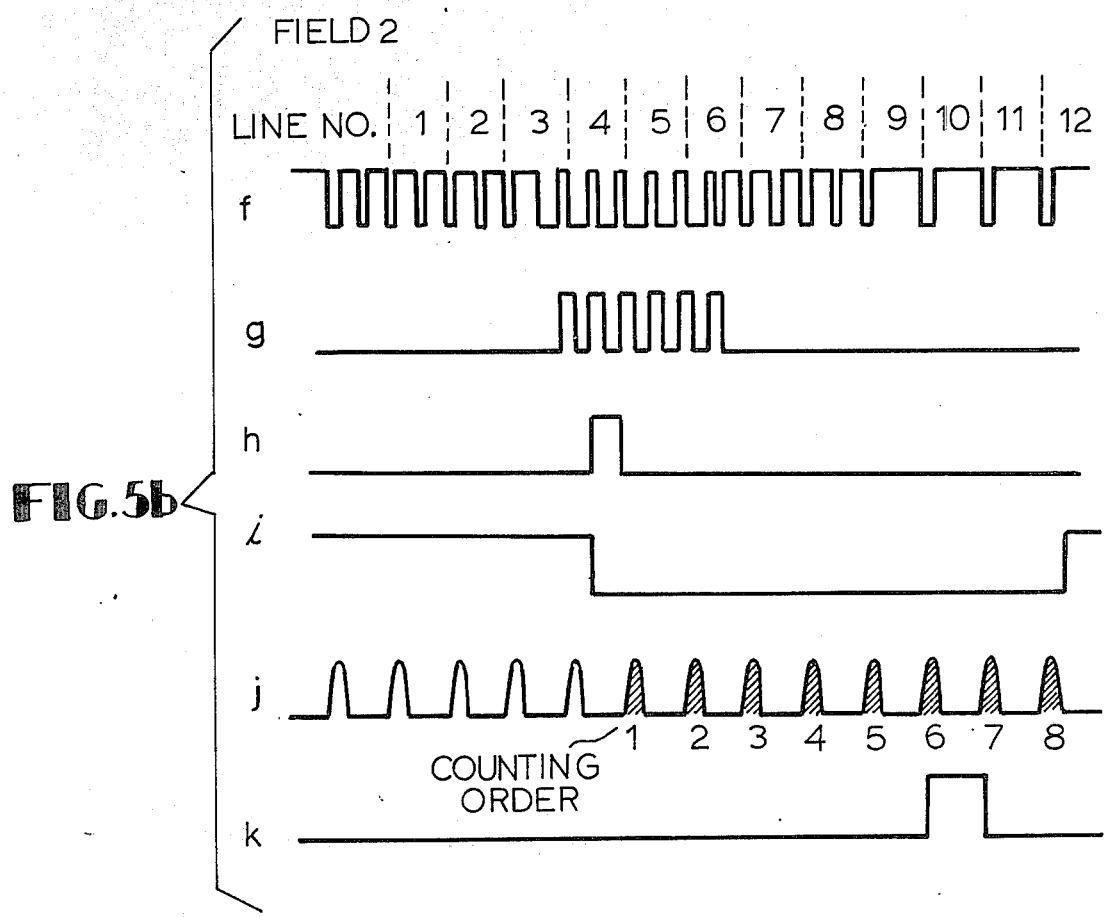

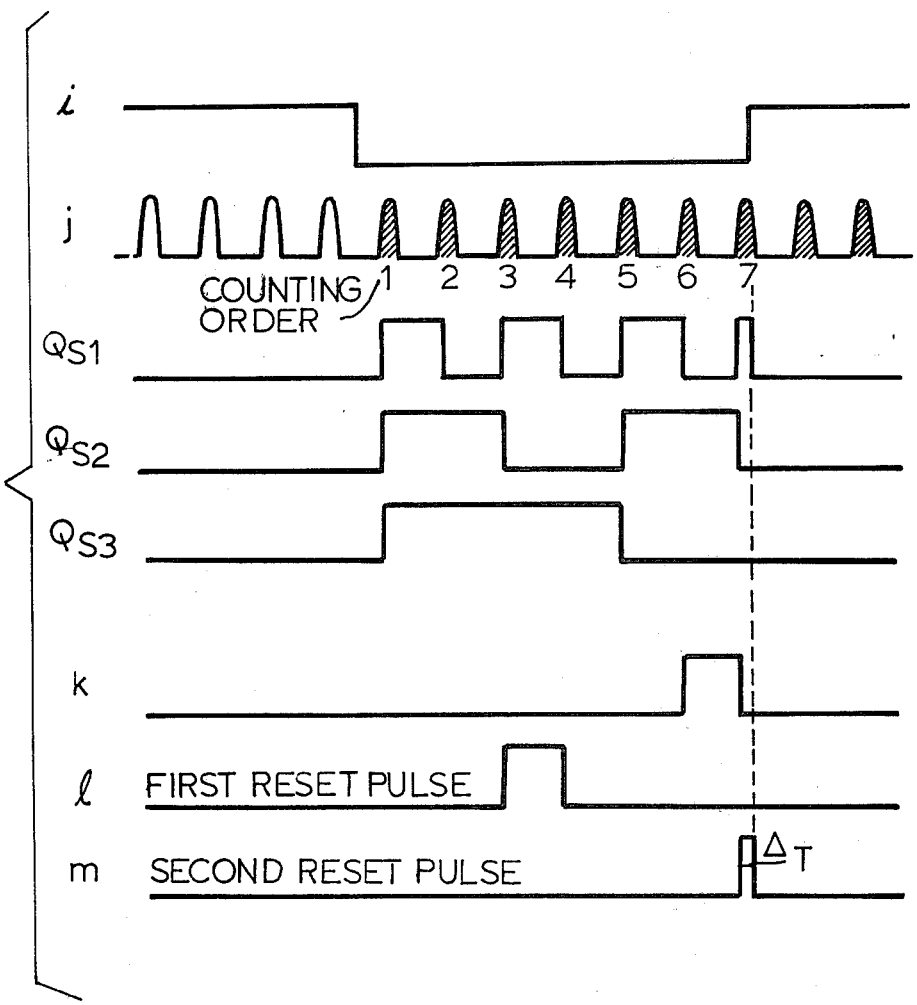

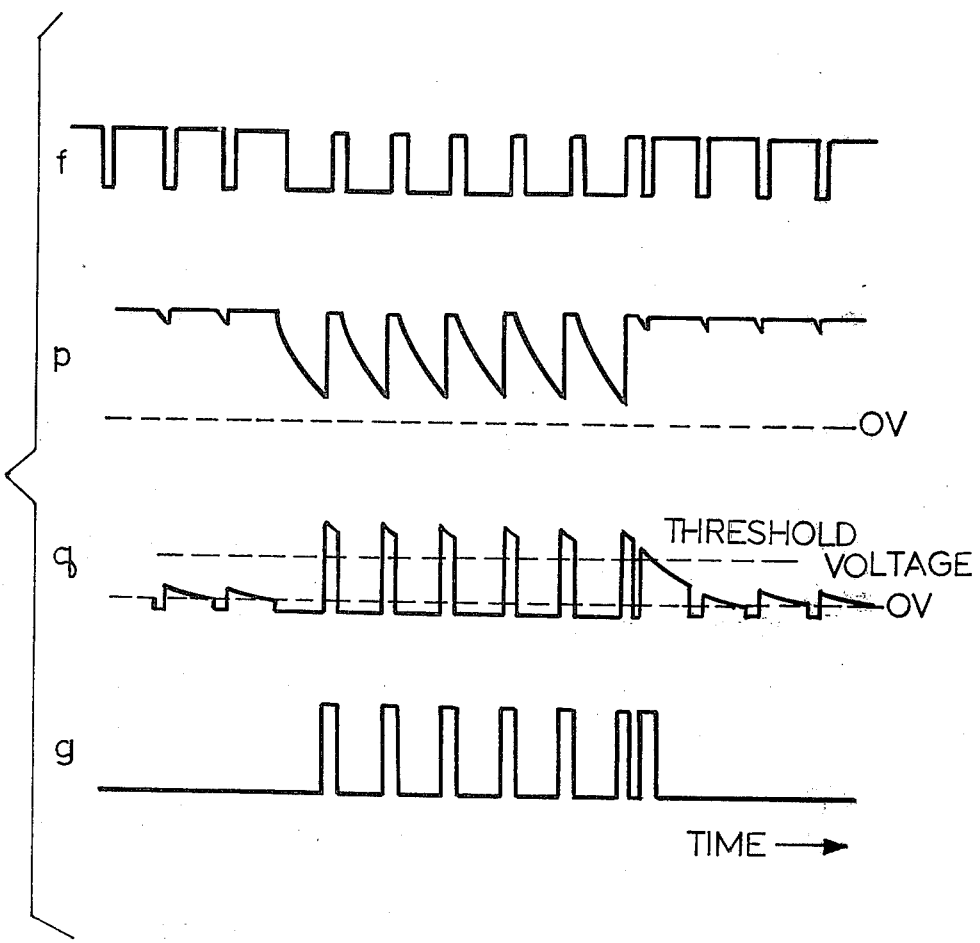

CIRCUITRY FOR LINE RECOGNITION OF A TELEVISION SIGNAL

BACKGROUND OF THE INVENTION

The present invention relates to a television receiver, and more particularly to an apparatus which identifies the line number of a television signal.

In order to utilize the Vertical Interval Test Signal (VITS) or the Vertical Interval Reference Signal (VIRS), a line recognizer is necessary which identifies the line number on which specific signals are placed. As shown in FIG. 1, a well known circuitry for above use consists of a integrator (1), a threshold circuit (2), a one-shot multivibrator (4) and a counter (5). A sync pulse, which is separated from a television signal by a sync separator (not shown in FIG. 1) is integrated by said integrator (1). The output signal of said integrator (1) is composed of the vertical sync pulse whose waveform is illustrated in FIG. 1, and fed to said threshold circuit (2). Said threshold circuit (2) detects a specific portion of the integrated sync signal which has a larger amplitude than a predetermined threshold level which is determined by the potentiometer (3). The output signal of said threshold circuit (2) triggers said one-shot multivibrator (4) which produces so-called "Counter Enabling Pulse" on its output terminal. The enabling pulse controls operation of said counter (5).

HIGH state of said enabling pulse, for instance, inhibits action of said counter (5) and LOW state allows said counter (5) to count the number of horizontal retrace pulses applied to another input terminal of said counter (5). As said one-shot multivibrator (4) produces a negative-going pulse which has a specific time duration after being triggered by a leading edge of the output pulse of said threshold circuit (2), said counter (5) counts the number of said horizontal retrace pulses behind said leading edge of the output pulse of said one-shot multivibrator (4). Said counter (5) produces the line identification pulse which corresponds to the desired line interval on which VITS or VIRS are placed. After specific time duration sufficient to line identification of said counter (5), said one-shot multivibrator (4) turns said enabling pulse HIGH which inhibits operation of said counter (5). Said counter (5), therefore, continues to be quiescent until next arrival of the vertical sync pulse of the next field.

This prior art requires adjustment of said predetermined threshold level in assembly lines, because said integrated vertical sync pulse has variations in amplitude or waveform due to variations of electrical components or source voltages. In addition, this circuit configuration is not suitable for integrated circuit design because said integrator and said one-shot multivibrator requires many capacitors which cannot be integrated in a chip of integrated circuits. These capacitors increase pins around the integrated circuit and therefore raises IC's price.

SUMMARY OF THE INVENTION

It is, therefore, an object of the present invention to provide a novel and improved line recognizing apparatus which is free from any adjustment in assembly lines.

It is another object of the present invention to provide a novel and improved line recognizing apparatus which is suitable for the integrated circuit design.

These objects are achieved by providing a circuitry for line recognition of a television receiver according to the present invention, which comprises serration detecting means which receives a composite sync pulse for separating a portion of the serration of the vertical sync pulse, a first counting means which is coupled to said serration detecting means for producing an output pulse at specific time interval between two successive output pulses of said serration detecting means, enabling means which is trigged by the output pulse of said first counting means for producing an enabling pulse, a second counting means which receives said enabling pulse and a horizontal retrace pulse for counting said horizontal retrace pulse when said enabling pulse has a specific level, said second counting means becoming quiescent when said enabling pulse has another specific level and producing a line identification pulse on a desired horizontal line, first decoding means which is connected to said second counting means for producing a reset pulse for resetting said first counting means after said first counting means completes its desired counting action, and second decoding means which produces a reset pulse for resetting said enabling means after said second counting means produces the desired line identification pulse.

DESCRIPTION OF DRAWINGS

These and other objects and the features of the invention will be apparent from the following description of the invention taken in connection with the accompanying drawings, in which:

FIGS. 5a and 5b are charts showing waveforms appearing at principal points of the embodiment of FIG. 4;

FIGS. 8a and 8b are block diagrams and waveforms of the second counting means used in FIG. 7;

FIG. 11 is waveforms appearing at principal points of the embodiment of FIG. 10.

DESCRIPTION OF PREFERRED EMBODIMENTS

Figure 1:
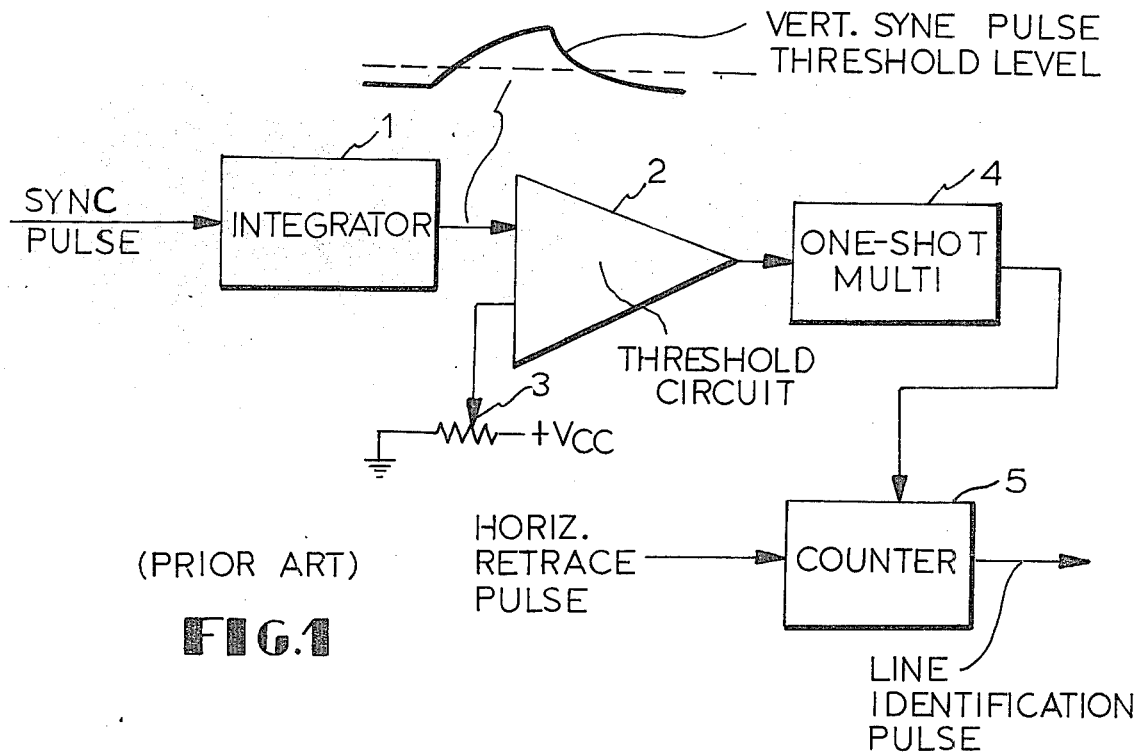
FIG. 1 is a blockdiagram of a prior art, as described above.
Figure 2:
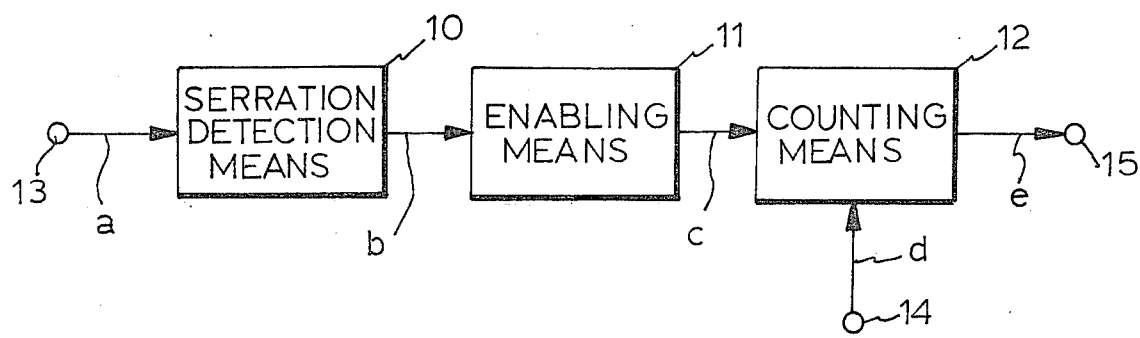
FIG. 2 is a blockdiagram of an embodiment according to the present invention.
Figure 3:
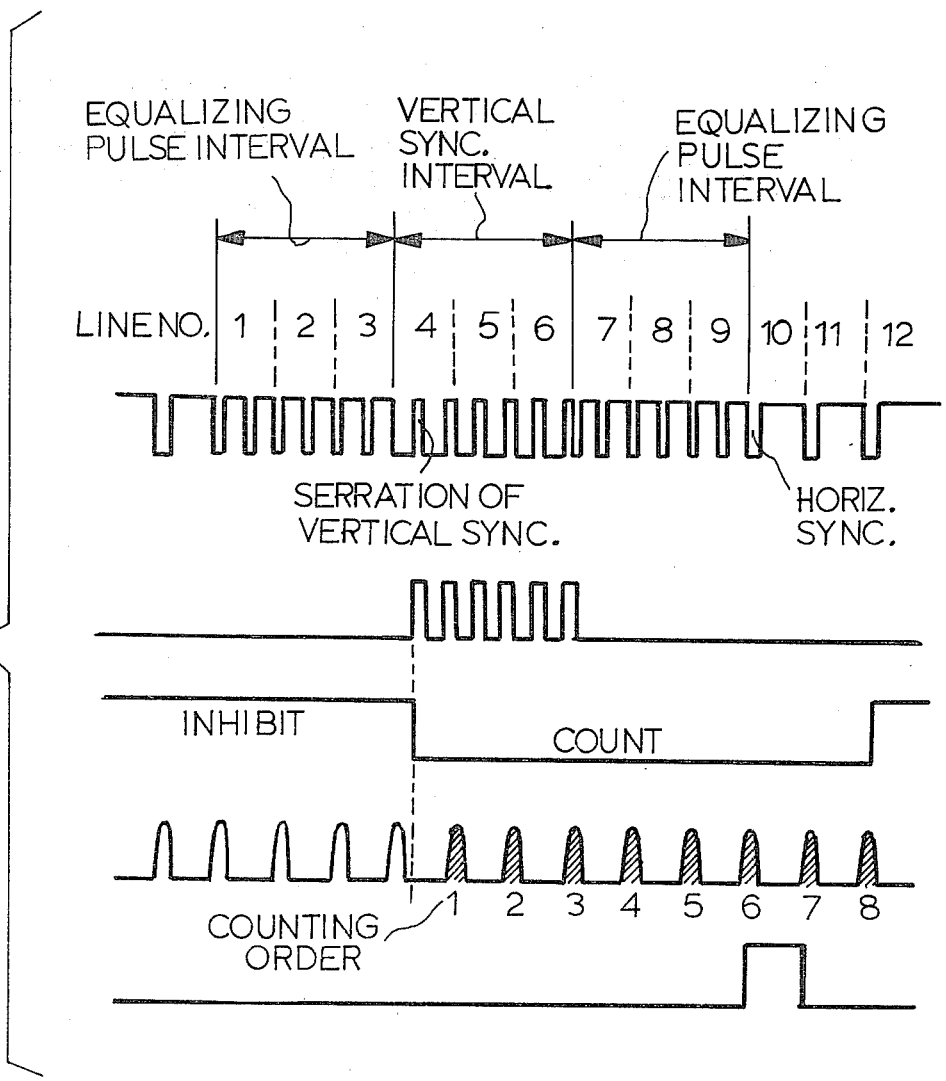
FIG. 3 is a chart showing waveforms appearing at principal points of the embodiment of FIG. 2.

Turning now to FIG. 2, there is shown a blockdiagram of an embodiment according to the present invention. FIG. 3 shows waveforms of the embodiment of FIG. 2. On an input terminal (13), a composite sync pulse is applied. As shown in FIG. 3, the composite sync pulse consists of the horizontal sync pulse, the vertical sync pulse and the equalizing pulse. The vertical sync pulse has several serrations. A serration detecting means (10) separates these serrations from the composite sync pulse, as shown in FIG. 3. The separated serration pulses trigger an enabling means (11) which comprises a one-shot multivibrator. A leading edge of the separated serrations turns the output pulse of said enabling means (11) LOW which allows a counting means (12) to count the number of a horizontal retrace pulse applied on another input terminal (14). Said counting means (12) produces a line identification pulse on an output terminal (15) according to the same operation as that of said counter (5) of FIG. 1.

An important advantage of the embodiment of FIG. 2 over the prior art is that the enabling means is triggered by the serration pulses instead of the some part of the integrated vertical sync pulse. Because the integrated vertical sync pulse has a very gradual slope, said threshold circuit (2) of FIG. 1 should have very accurate threshold level. This requirement of such the accuracy makes it impossible to eliminate the adjustment in assembly lines. On the contrary, the present invention needs no adjustment in production lines, because said serration detecting means can separate the serrations even with rather poor accuracy of threshold level as will be described hereinafter.

Actual television sync signal has a phase displacement of half-line between the horizontal and the vertical sync pulses in successive fields for the purpose of line-interlace. Referring to FIGS. 5a and 5b, it becomes apparent that the embodiment of FIG. 2 produces the line identification pulse on line 10 in field 1 and on line 9 in field 2.

Figure 4:
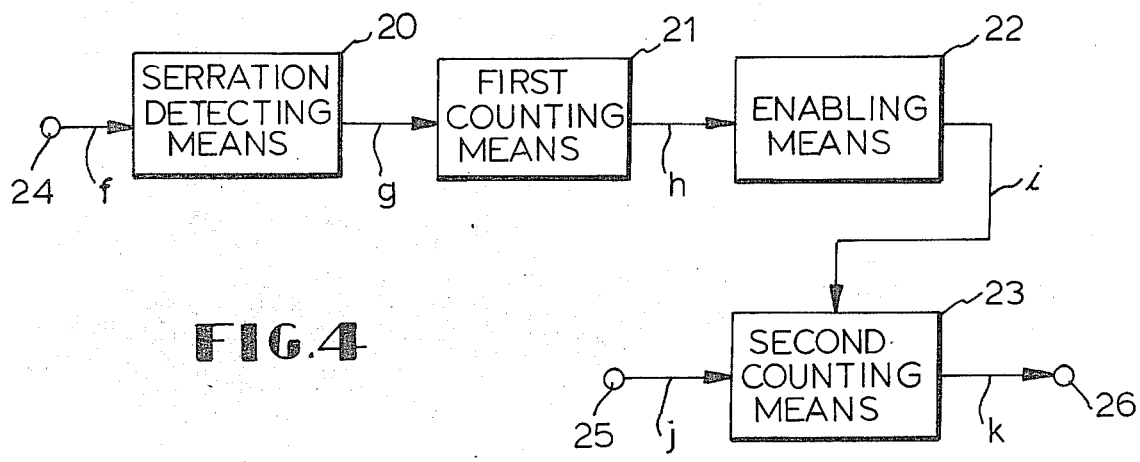
FIG. 4 is another embodiment according to the present invention.

In FIG. 4, there is shown another embodiment according to the present invention which is capable of identifing the line number properly in the line-interlaced television signal. FIGS. 5a and 5b are the time chart of the embodiment of FIG. 4. Onto the input terminal (24), the composite sync pulse is applied. The serration detecting means (20), the enabling means (22) and the second counting means (23) are the same as said serration detecting means (10), said enabling means (11) and said counting means (12) of FIG. 2, respectively. Onto the terminal (25), the horizontal retrace pulse is applied. From the out terminal (26), the line identification pulse is derived. An only difference from FIG. 2 is presence of the first counting means (21) between the serration detecting means (20) and the enabling means (22).

Said first counting means (21) receives the separated serration pulse designated (g) in FIGS. 5a and 5b, and counts the number of the serration pulse. Then, said first counting means (21) produces the triggering pulse (h) for said enabling means (22) when the second serration pulse is applied. Then, the enabling pulse (i) from the enabling means (22) falls to LOW at the leading edge of the triggering pulse (h). As will be easily understood from FIGS. 5a and 5b, said second counting means (23) produces properly the line identification pulse in both fields. The half-line delay of triggering achieved by said first counting means (21) assures correct line-identification in the line-interlaced television signal. One and half-line delay or two and half-line delay are also sufficient for correct identification, although circuitry becomes rather complicated.

Figure 6:
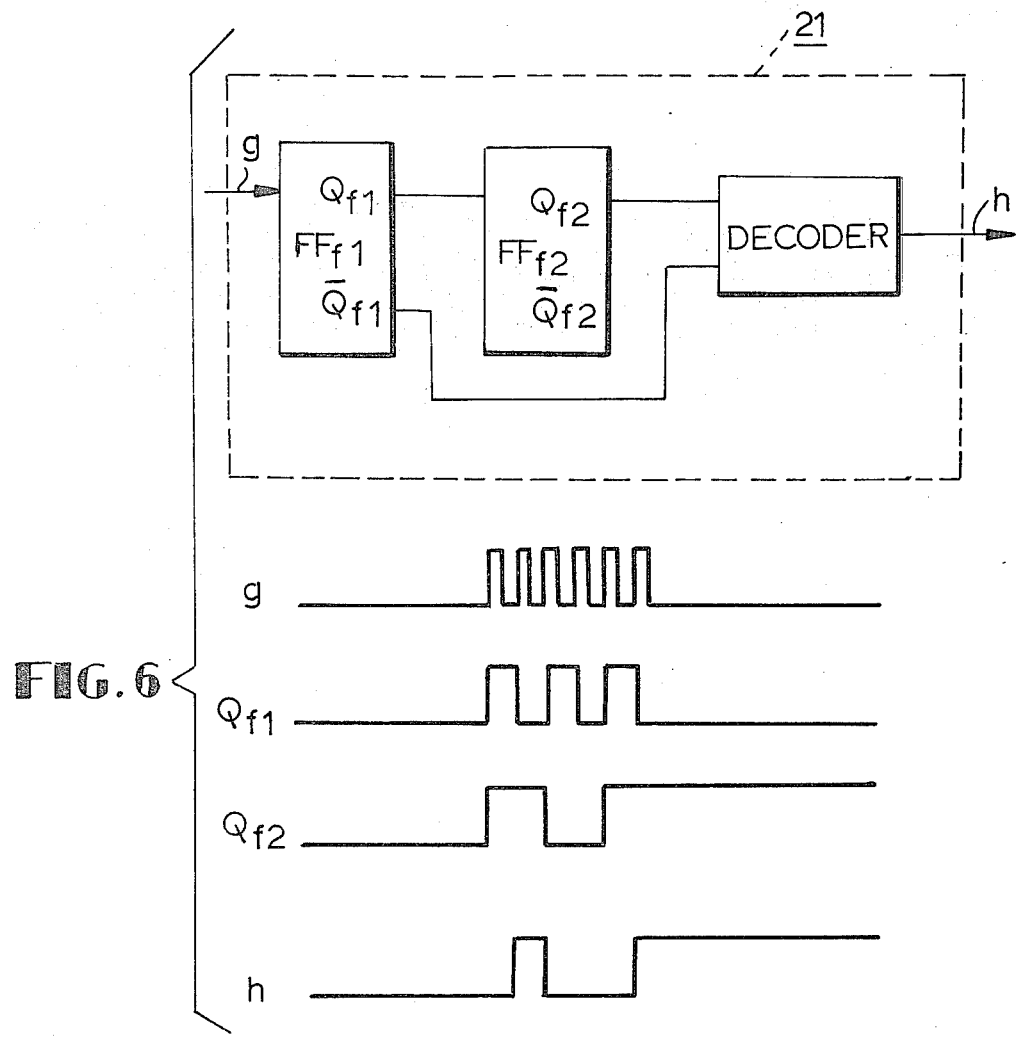
FIG. 6 is a block diagram and waveforms of the first counting means used in FIG. 4.

FIG. 6 shows a blockdiagram of said first counting means (21) of FIG. 4. Two flip-flops $FF_{f1}$ and $FF_{f2}$ are connected in cascade and produce the outputs $Q_{f1}$ and $Q_{f2}$ in response to the separated serration pulse (g). The complimentary output $\overline{Q}_{f1}$ and $\overline{Q}_{f2}$ are also available. The decoder combines $Q_{f2}$ and $\overline{Q}_{f1}$, and produces an output pulse (h) which is the triggering pulse for a next stage. In this case, said decoder is AND circuit. As the next stage is triggered by the leading edge of said output pulse (h), the pulse waveform behind the leading edge has no effect on operation of the next stage.

Said enabling means (22) comprises a one-shot multivibrator which needs a capacitor of relatively large value. It is desirable to eliminate these capacitors in order to integrate these circuitry on a silicon chip. In addition, in order to accept the vertical sync pulse of successive fields, a means for resetting said first counting means (21) after completion of its desired operation is necessary. This resetting means can be achieved by a one-shot multivibrator like said enabling means (22). However, from the same reason as said enabling means (22), elimination of a capacitor is desirable for the integrated circuit design.

Figure 7:
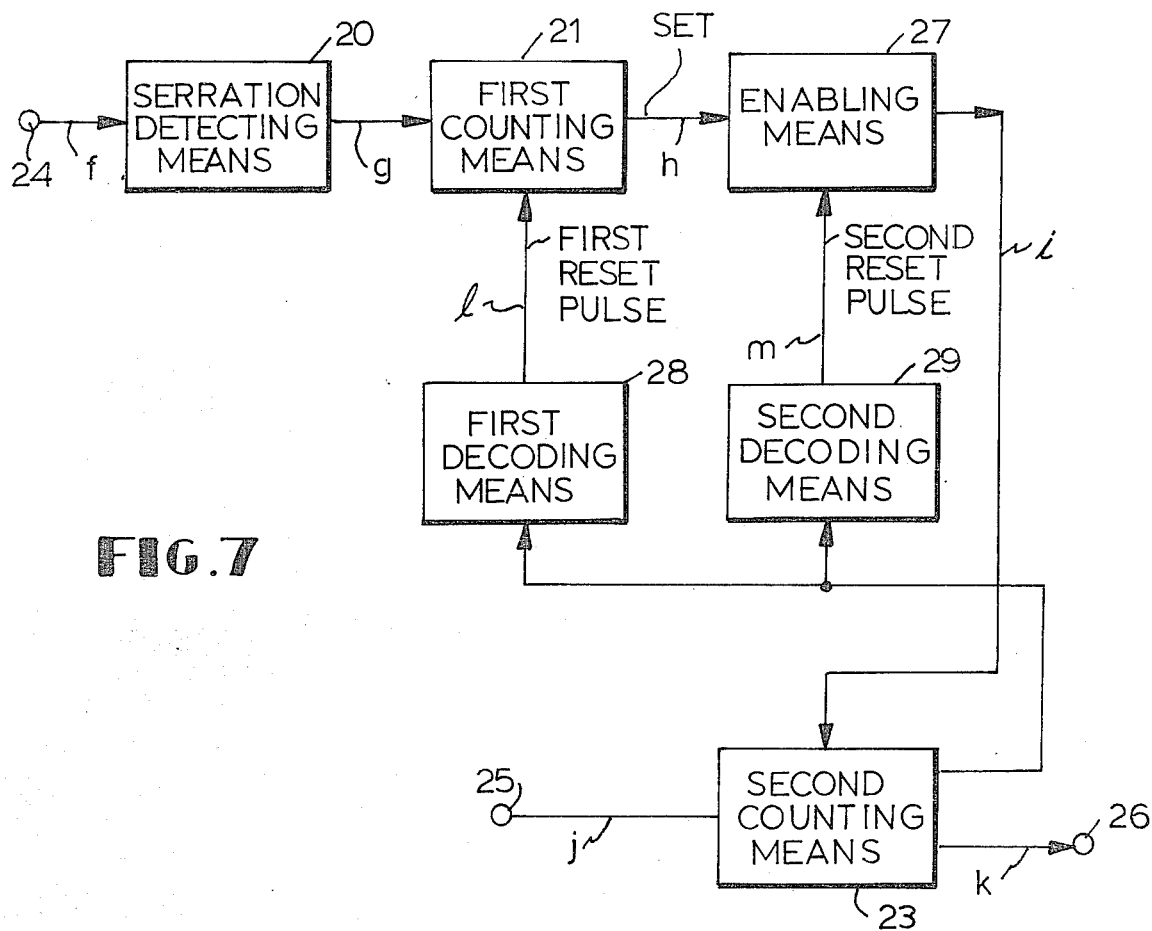
FIG. 7 is a block diagram of a further embodiment according to the present invention.

FIG. 7 shows another embodiment according to the present invention which has a circuit configuration suitable for the integrated circuit. The means designated by the same numerals perform the same operations as those of FIG. 4. In FIG. 7, the first decoding means (28) and the second decoding means are newly added to FIG. 4, and the enabling means (27) of FIG. 7 comprises a R-S flip-flop instead of the one-shot multivibrator of FIG. 4. Said enabling means (27) receives the triggering pulse from said first counting means (21) on the set terminal. The enabling pulse (i) falls to LOW at the leading edge of the triggering pulse (h). Then, said second counting means (23) starts counting the number of the horizontal retrace pulse (j) applied on said input terminal (25).

Figure 8B:
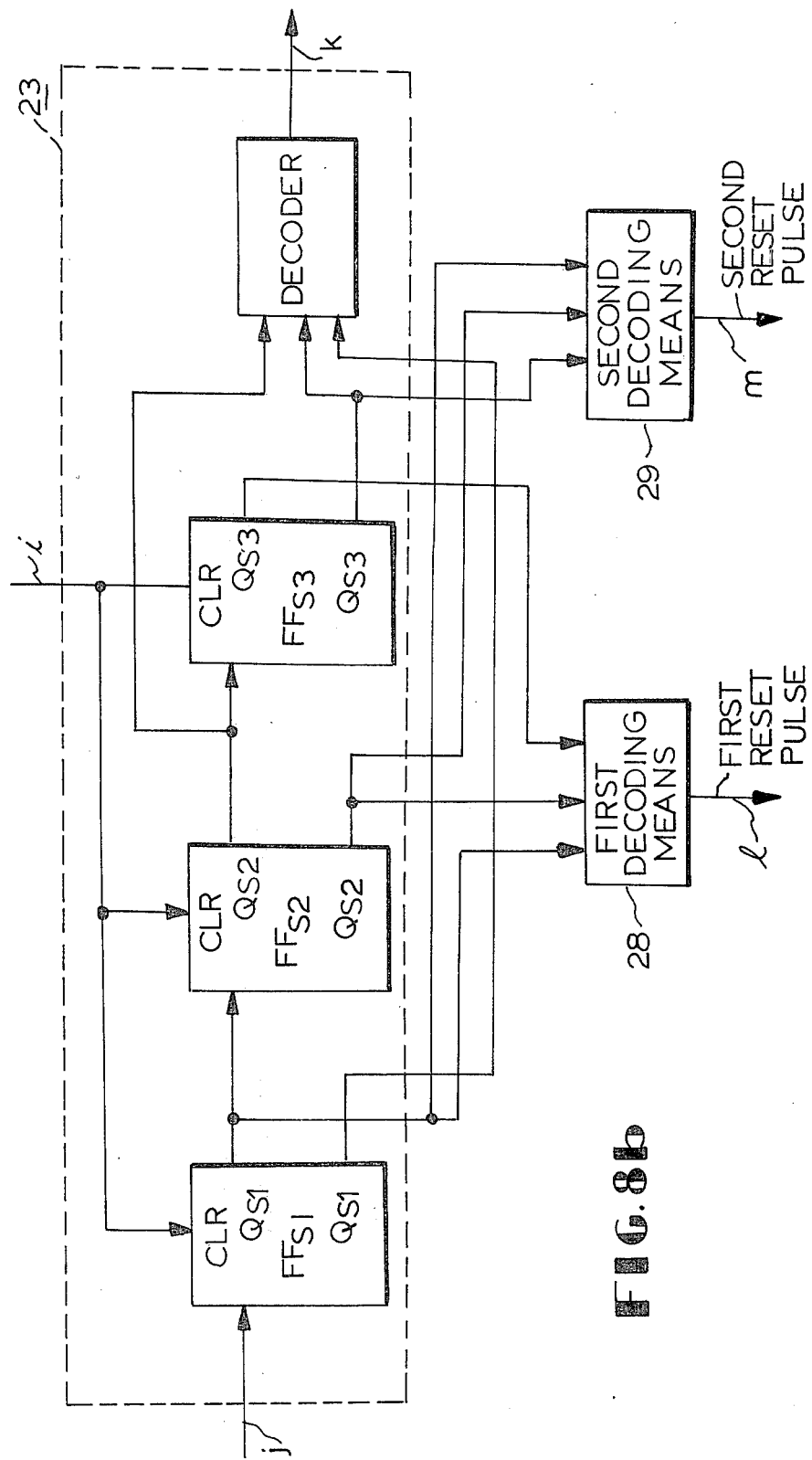

FIGS. 8a and 8b show a circuit configuration and operational waveforms of said second counting means (23). Said second counting means comprises three flip-flops $FF_{s1}$, $FF_{s2}$ and $FF_{s3}$ and a decoder. Each flip-flop has a CLR terminal (which means "Clear" terminal) for stopping the action of the flip-flop on receiving the enabling pulse (i) of HIGH state. Each flip-flop has also an output Q and a complementary output $\overline{Q}$. The three flip-flops $FF_{s1}$, $FF_{s2}$ and $FF_{s3}$ produce output pulses $Q_{s1}$, $Q_{s2}$ and $Q_{s3}$, respectively whose waveforms are shown in FIG. 8 below the blockdiagram. The decoder receives $\overline{Q}_{s1}$, $\overline{Q}_{s2}$ adn $\overline{Q}_{s3}$ and produces the output pulse (k) when all input pulses become HIGH. Thus, the desired line identification pulse is obtained on the output terminal of said decoder. Said first decoding means (28) and said second decoding means (29) combine the output pulses of $FF_{s1}$, $FF_{s2}$ and $FF_{s3}$. Selection of logical function of the decoding means enables producing several pulses on desired television lines.

In FIGS. 8a and 8b, said first decoding means (28) produces the output pulse (l), which is the first reset pulse for said first counting means (21), according to the logical equation $l = Q_{s1} \cdot \overline{Q}_{s2} \cdot Q_{s3}$. Said first reset pulse (l) puts back said first counting means (21) to the initial state. Therefore, said first reset pulse (l) should be generated after completion of the desired counting action of said first counting means (21).

Said second decoding means (29) produces the output pulse (m), which is the second reset pulse for said enabling means (27), according to the logical equation $m = Q_{s1} \overline{Q}_{s2} Q_{s3}$. Said second reset pulse (m) is applied to said enabling means (27) and raises said enabling pulse (i) to HIGH which stops the counting action of said second counting means (23). As said second decoding means (29), said enabling means (27) and said second counting means (23) have some time-delay, said second reset pulse (m) becomes a pulse whose duration is ΔT.

Said second reset pulse (m) should arrise after completion of the desired counting action of said second counting means (23) to produce the line identification pulse. Although said second reset pulse (m) is placed on line 11 in the embodiment of FIG. 8b, it is apparent from the foregoing description that any line number behind a desired line identification pulse will do.

Figure 9:
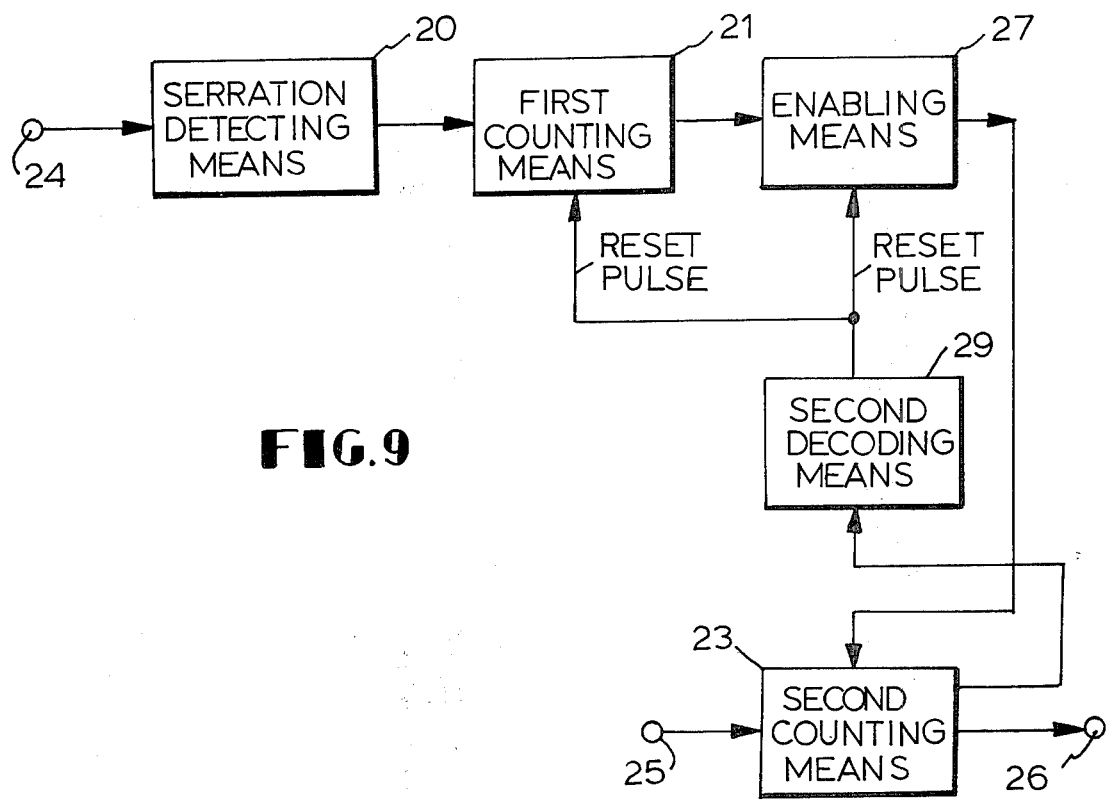
FIG. 9 is a block diagram of a further embodiment according to the present invention.

For cost saving purpose, it is desirable and possible that said first decoding means (28) is eliminated, and in this case the reset pulse for said first counting means (21) is applied from said second decoding means (28), as shown in FIG. 9.

Figure 10:
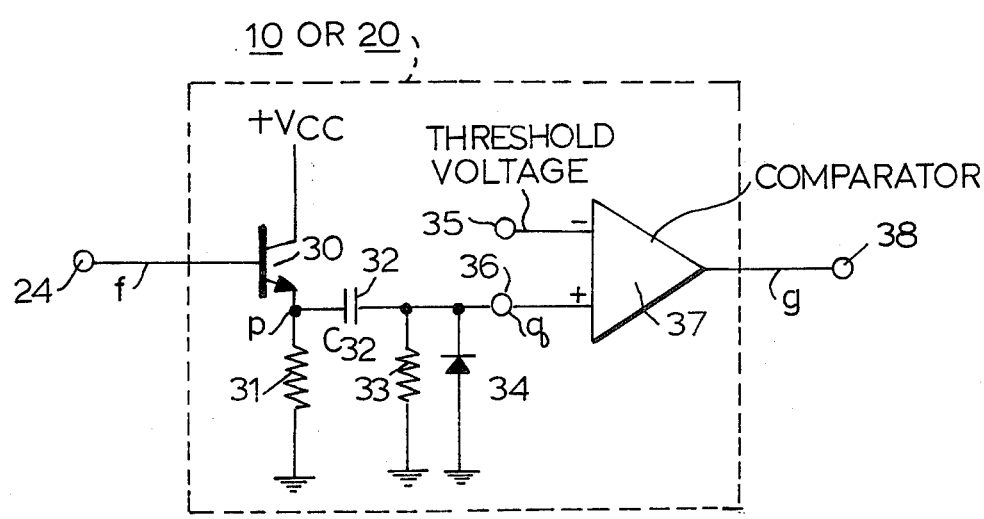
FIG. 10 is a circuit diagram of an embodiment of the serration detecting means used in FIGS. 2, 4, 7 and 9.

In FIG. 10, there is shown an example of circuit configuration of said serration detecting means (10) or (20). Operational waveforms of the circuit of FIG. 10 are illustrated in FIG. 11.

Onto the terminal (24), the composite sync pulse (f) is applied. If the base electrode of the transistor (30) is HIGH, said transistor (30) is ON and electrical charge is stored in the capacitor (32). When the base-electrode of said transistor (30) becomes LOW, said transistor (30) turns OFF, and the electrical charge stored in said capacitor (32) discharges through a path of capacitor (32)→resistor (31)→diode (34).

After specific time duration of OFF state of said transistor (30), the voltage of the base-electrode of said transistor (30) is made HIGH by the composite sync pulse. Then, said transistor (30) becomes ON, and the emitter-voltage thereof goes up by the amount equal to voltage decrease across said capacitor (32) during OFF-interval of said transistor (30). This instantaneous increase of the emitter-voltage is transferred to the terminal (36) via said capacitor (32), because the voltage across said capacitor (32) does not change abruptly. Continuation of ON state of said transistor (30) makes electric current to flow through a path of +Vcc→transistor (30)→capacitor (32)→resistor (33)→ground. This current decreases gradually according to the time constant of $C_{32} \times R_{33}$. Therefore, the voltate appearing on said terminal (36) decreases gradually also.

The amount of the voltage decrease across said capacitor (32) during OFF state of said transistor (30) depends on the time interval of the OFF state. Thus, the voltage appearing on said terminal (36) is modulated with the pulse-width of the sync pulse. As the vertical sync pulse has the widest pulse-width among the vertical sync, the horizontal sync and the equalizing pulse, very large pulses appear on said terminal (36) at the portion of the serration of the vertical sync pulse. It is very easy to separate these large pulses from the relatively small pulses appearing at the portion of the horizontal sync pulse and the equalizing pulse, and so even poor accuracy of the threshold voltage applied on the terminal (35) is sufficient to detect the desired serration pulses. Therefore, the comparator can produce the serration pulse on the output terminal (38) without any adjustment in production lines.

As shown in FIG. 11, the height-modulated pulse (p) in response to the width of the sync pulse appears on the emitter-electrode of said transistor (30). It is possible to utilize this height-modulated pulse for separation of the vertical sync pulse.

Figure 12:
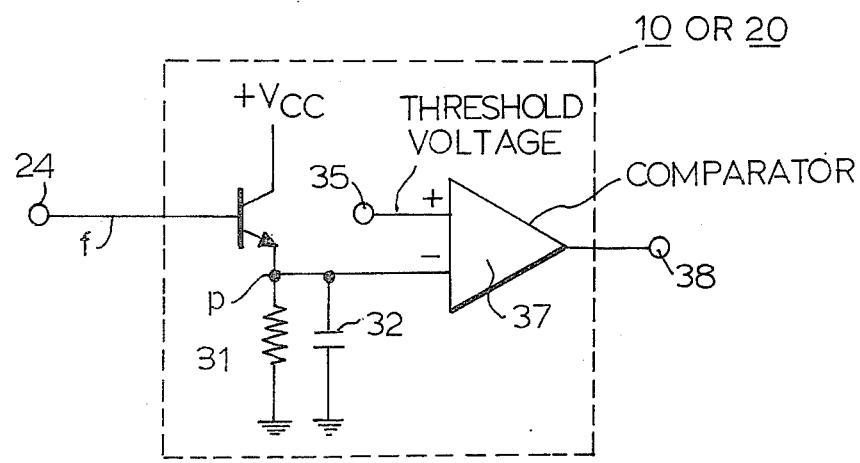
FIG. 12 is a circuit diagram of another embodiment of the serration detecting means used in FIGS. 2, 4, 7 and 9.

FIG. 12 shows another embodiment of said serration detecting means (10) or (20) according to the above principle. Compared to FIG. 10, said resistor (33) is made zero ohm because said resistor (33) has no effect for present purpose. Said comparator (37) produces the output pulse when the emitter-voltage is less than the threshold voltage applied to the terminal (35). Referring to the waveform (p) of FIG. 11, it is easily understood that said comparator can separate the vertical sync pulse which can be used for alternative pulses for said separated serration pulses.

As clearly mentioned hereinbefore, the present invention provides more effective method for line recognition of the television signal which has such advantage over the prior art as adjustment-free and suitable for integrated circuit design.

In the foregoing description, it is assumed that the desired identification line is line 10. However, it is apparent that any desired line can be identified by the present invention.

It is intended that all matter contained in the foregoing description and in the drawings shall be interpreted as illustrative only, not as limitative, of the invention.

What is claimed is:

1. Circuitry for line recognition of a television signal comprising; serration detecting means which receives a composite sync pulse for separating a portion of the serration of the vertical sync pulse, first counting means which is coupled to said serration detecting means for producing an output pulse at specific time interval between two successive output pulses of said serration detecting means, enabling means which is triggered by the output pulse of said first counting means for producing an enabling pulse, second counting means which receives said enabling pulse and a horizontal retrace pulse for counting said horizontal retrace pulse when said enabling pulse has a specific level, said second counting means becoming quiescent when said enabling pulse has another specific level and producing a line identification pulse on a desired horizontal line, first decoding means which is connected to said second counting means for producing a reset pulse for resetting said first counting means after said first counting means completes its desired counting action, and second decoding means which is connected to said second counting means and produces a reset pulse for resetting said enabling means after said second counting means produces the desired line identification pulse.

2. Circuitry for line recognition of a television signal as claimed in claim 1, wherein said reset pulse for said first counting means is supplied from said second decoding means.

3. Circuitry for line recognition of a television signal as claimed in claim 1, wherein said serration detecting means comprises; a transistor whose base-electrode is supplied with the sync pulse, a first resistor which is connected between the emitter-electrode of said transistor and the ground, a parallel connection of a second resistor and a diode whose anode is grounded, a capacitor which is connected between the emitter-electrode of said transistor and the cathode-electrode of said diode, and a threshold circuit connected to the cathode-electrode of said diode, wherein the pulse-width of the sync pulse is converted to a pulse-height, and a specific portion of said height-modulated pulse larger than a predetermined threshold level is detected.

4. Circuitry for line recognition of a television signal as claimed in claim 1, wherein said serration detecting means comprises; a transistor whose base-electrode is supplied with the sync pulse, a resistor connected between the emitter-electrode of said transistor and the ground, a capacitor which is connected with said resistor in parallel, and a threshold circuit connected to the emitter-electrode of said transistor, wherein the pulse-width of the sync pulse is converted to pulse-height, and a specific portion of said height-modulated pulse smaller than the predetermined threshold level is detected.

5. Circuitry for line recognition of a television signal comprising; serration detecting means which receives a composite sync pulse for separating a portion of the serration of the vertical sync pulse, enabling means which receives an output pulse of said serration detecting means for producing an enabling pulse at the leading edge of said output pulse from said serration detecting means, said enabling means returning to the initial state of operation after specific time duration by itself, and counting means which receives said enabling pulse and a horizontal retrace pulse for counting said horizontal retrace pulse when said enabling pulse has a specific level, said counting means becoming quiescent when said enabling pulse has another specific level and producing a line identification pulse on a desired horizontal line.

6. Circuitry for line recognition of a television signal as claimed in claim 5, wherein said counting means comprises a first counting means and a second counting means, and said first counting means is inserted between said serration detecting means and said enabling means and produces specific time delay of triggering pulse for said enabling means.

7. Circuitry for line recognition of a television signal as claimed in claim 5, wherein said serration detecting means comprises; a transistor whose base-electrode is supplied with the sync pulse, a first resistor which is connected between the emitter-electrode of said transistor and the ground, a parallel connection of a second resistor and a diode whose anode is grounded, a capacitor which is connected between the emitter-electrode of said transistor and the cathode-electrode of said diode, and a threshold circuit connected to the cathode-electrode of said diode, wherein the pulse-width of the sync pulse is converted to a pulse-height, and a specific portion of said height-modulated pulse larger than a predetermined threshold level is detected.

8. Circuitry for line recognition of a television signal as claimed in claim 5, wherein said serration detecting means comprises; a transistor whose base-electrode is supplied with the sync pulse, a resistor connected between the emitter-electrode of said transistor and the ground, a capacitor which is connected with said resistor in parallel, and a threshold circuit connected to the emitter-electrode of said transistor, wherein the pulse-width of the sync pulse is converted to pulse-height, and a specific portion of said height-modulated pulse smaller tha the predetermined threshold level is detected.

* * * * *